June 1, 1943.  H. C. GATTY  2,320,359
METHOD OF ASCERTAINING FROM AIRCRAFT IN FLIGHT VARIATIONS IN THE
FORCE OF THE WIND AT VARIOUS DISTANCES BELOW THE AIRCRAFT
Filed July 11, 1940
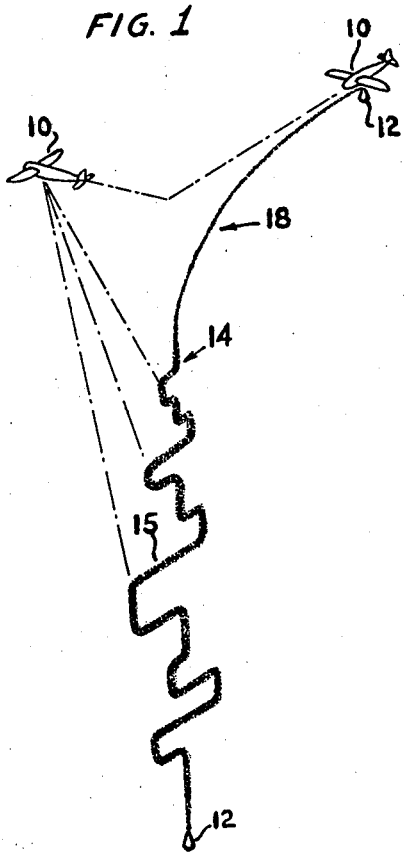
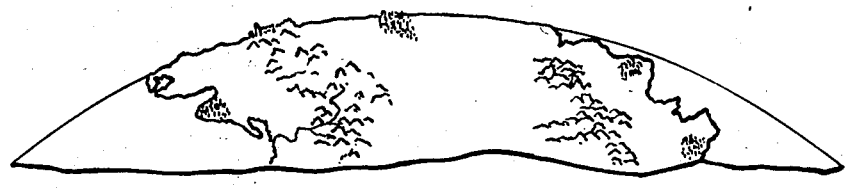
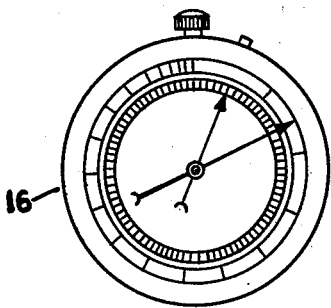
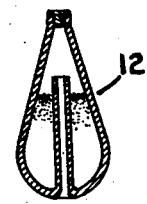
INVENTOR.
HAROLD CHARLES GATTY
BY Harry Lea Dodson
ATTORNEY Patented June 1, 1943

2,320,359

UNITED STATES PATENT OFFICE 2,320,359

METHOD OF ASCERTAINING FROM AIRCRAFT IN FLIGHT VARIATIONS IN THE FORCE OF THE WIND AT VARIOUS DISTANCES BELOW THE AIRCRAFT

Harold Charles Gatty, Treasure Island, Calif.

Application July 11, 1940, Serial No. 344,920

3 Claims. (Cl. 73—188)

It is well known that all air line costs are based on the time in the air; hence if a saving in time on a flight can be attained it will add greatly towards more economical operation. It is also well known that while the ship may be bucking a headwind at an altitude of 10,000 ft. there may be a very strong tail wind at some other altitude below that at which it is flying.

At the present time it is customary for a pilot to receive, prior to the take-off, a forecast or analysis of the winds at different altitudes on his route. While the art of meteorological forecasting has made much progress in recent years, unpredictable and local factors oftentimes render such forecasts inaccurate and so much so as to warrant a method of obtaining current information of winds at various altitudes while in flight most desirable.

Determination of the winds at various altitudes is at present only made from observations made from the ground at certain points where a meteorological observer is equipped with a balloon-theodolite and balloons which he inflates with hydrogen or helium.

It will therefore be clear, from the foregoing, that such analysis or forecast may be of little or no assistance to the pilot who is in flight.

My method has for its object to provide a series of steps which if followed will enable the pilot of an aircraft in flight to determine the most advantageous altitude at which to fly.

In the practice of my method certain mechanical devices are employed but it will be obvious from the hereinafter contained description that no specific form or construction of apparatus is essential to the practice of my method. I have, however, in the accompanying drawing, which is hereunto annexed and made a part of this specification, illustrated, in a more or less diagrammatic form, preferred types of apparatus to be used in the practice of my invention.

My means of accomplishing the foregoing object may be more readily understood by reference to the accompanying drawing which is hereunto annexed and forms a part of this specification in which:

Fig. 1 is a graph showing the manner of practicing my method.

Fig. 2 is a view of the recording instrument.

Fig. 3 is a view of the device containing the sky-marking material.

Similar reference numerals refer to similar parts throughout the entire specification.

In order for a pilot or an observer in an aircraft 10 in flight to utilize my method, he should be provided with a small container such as 12. This is preferably shaped for least resistance in passing through the air. It is filled with a composition of any materials which may be used for sky writing such as vapor producing chemicals or other substances, powders, or smoke emitting materials. The purpose of this is to leave a visible trail of vapor, smoke, powder or luminescent material 14. After the container loses the greater part of its forward velocity it will fall by gravity to the earth's surface. This will leave a visible trail 14, of its path to be air borne and thus provide a visible indication of the fluctuations of the air at different distances below the aircraft.

The pilot must also be provided with a recording instrument. As shown it is a watch-like device 16, having mechanism equivalent to a stop watch marked around the dial in hundreds of feet, based on the known rate of fall of the container 12. The graduations on the watch 16, should allow for trajectory caused by the initial forward velocity given to the container 12, by the forward velocity of the aircraft 10. This is graphically illustrated at 18.

It is apparent from the foregoing description that it does not matter what kind or shape of container is used or what chemicals it is filled with, just so it will emit a visible trail such as smoke, etc. as it falls.

It will be seen also that no particular form or kind of recording instrument is required provided it will record the time and velocity of the fall, although the latter may be omitted. It should, however, have graduations for calculating the speed at which the aircraft is traveling so the operator may allow for the forward travel of the container before gravity causes it to fall vertically.

The manner of practicing my method and the steps by which the method should be carried out are as follows:

The observer in the aircraft is naturally desirous of reaching his objective or destination in the shortest possible time. After the take-off, he climbs for example to an altitude of 11,000 feet and sets his course. He can see on the ground below indication of the direction of the wind there. He has personally had no way of determining what advantageous winds or what less disadvantageous winds there may be at altitudes between himself and the ground. He first throws over one of the containers 12, constructed as described above, at the same time preferably he makes a 90 degree turn, so that he may observe the visible trail of skywriting material emitted by the container. The turn need not be a full 90 degrees, it might be a circle, any deviation from his course from which he can determine by observation the movement of such visible trail with relation to his previous course will suffice. The pilot stays on this course until the container nears the surface of the ground or water.

As he throws the container 12, from the aircraft 10, he starts his specially graduated recording instrument 16 and observes the visible trail 14, left by the container.

This visible trail becomes air borne as illustrated at 15, and will be subject to fluctuations, mainly horizontal, according to the direction and velocity of the wind at the various altitudes.

The observer watches for the bulge in the trail which will be most advantageous for him, in the direction in which his destination lays.

In the practice of my method the observer is only interested in obtaining the greatest advantage from winds on his course and is not necessarily attempting to determine the actual velocity of the wind since the results he obtains are relative.

From his recording instrument 16, he is able to read, when he observes a bulge in the path nearest the direction of his destination, how many feet below him is the most advantageous altitude at which to fly, and taking into account the efficiency of his engine and aircraft at various altitudes, descends so as to be able to take advantage of the favorable or less unfavorable winds.

Having described my method, what I regard as new and desire to secure by Letters Patent is:

1. The method of ascertaining from an aircraft in flight variations in the force of the wind at various altitudes comprising the following steps; dropping from said moving aircraft a device which leaves a visible trail, turning the aircraft from its previous course, observing the variations in the visible trail while timing the fall of the said device to the point of the greatest favorable variation, whereby to determine the altitude of such variation.

2. The method of ascertaining from an aircraft in flight variations in the force of the wind at various altitudes comprising the following steps; dropping from said moving aircraft a vapor producing device, turning the aircraft at right angles to its previous course, observing the variations in the vapor emitted by said device, timing the fall of the said device to the point of the greatest favorable variation, whereby to determine the distance below the aircraft of such variation.

3. The method of ascertaining flying conditions from aircraft in flight comprising; projecting from said aircraft, a body of sky-marking material and thereby tracing a visible descending path, maneuvering said aircraft to permit observation of said path, and timing the descent of said material to an altitude of most favorable variation of the wind currents as indicated by the pattern of said path to determine the distance between said aircraft and said most favorable altitude.

HAROLD CHARLES GATTY.